United States Patent
Guri

(10) Patent No.: US 10,834,729 B1
(45) Date of Patent: Nov. 10, 2020

(54) USER AWARE DISTRIBUTED ANTENNA SYSTEM

(71) Applicant: ASOCS Ltd., Rosh Haayin (IL)

(72) Inventor: Gabriel Guri, Rosh Haayin (IL)

(73) Assignee: ASOCS Ltd., Rosh Haayin (IL)

(*) Notice: Subject to any disclaimer, the term of this patent is extended or adjusted under 35 U.S.C. 154(b) by 0 days.

(21) Appl. No.: 16/374,591

(22) Filed: Apr. 3, 2019

Related U.S. Application Data

(60) Provisional application No. 62/651,988, filed on Apr. 3, 2018.

(51) Int. Cl.
*H04W 72/04* (2009.01)
*H04W 72/08* (2009.01)
*H04L 5/00* (2006.01)
*H01Q 1/24* (2006.01)
*H04W 88/08* (2009.01)

(52) U.S. Cl.
CPC .......... *H04W 72/048* (2013.01); *H01Q 1/246* (2013.01); *H04L 5/0037* (2013.01); *H04W 72/085* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 2012/0039320 A1* | 2/2012 | Lemson | H04W 40/02 370/338 |
| 2012/0134279 A1* | 5/2012 | Tamaki | H04B 7/024 370/248 |
| 2016/0295564 A1* | 10/2016 | Landry | H04W 12/06 |
| 2017/0366268 A1* | 12/2017 | Trajkovic | H04W 88/085 |
| 2019/0116568 A1* | 4/2019 | Fertonani | H04W 56/00 |
| 2019/0289497 A1* | 9/2019 | Rajagopal | H04B 7/0456 |

* cited by examiner

*Primary Examiner* — Xavier S Wong
(74) *Attorney, Agent, or Firm* — Cesari and McKenna, LLP

(57) ABSTRACT

Distributed antenna systems (DAS) and methods are disclosed that are aware of cellular user/antenna relationships. The DAS systems and/or methods include or use one or more User Aware Units that provide the functionality of knowing (or, knowledge of) which cellular user(s) each antenna can communicate with (and vice versa). The User Aware Unit functions to gather information about the reception in each antenna in order to identify the cellular users that the respective antenna can communicate with or best communicate with compared to other cellular users.

1 Claim, 3 Drawing Sheets

USER AWARE DISTRIBUTED ANTENNA SYSTEM

CROSS-REFERENCE TO RELATED APPLICATION

This application is based upon and claims priority to U.S. provisional patent application 62/651,988, entitled "User Aware Distributed Antenna System," filed 3 Apr. 2018; the entire content of which application is incorporated herein by reference.

BACKGROUND

Distributed antenna system (DAS) is a method used mainly in cellular systems to cover indoor areas (buildings, malls, stadiums, etc.) or in some cases outdoor areas. The system is based on two main parts. The first one is the cellular base-station (macro base station, small cell, etc.). The second part includes taking the base-station interface (or aggregation of few base-stations) and distributing it to multiple antennas deployed in the given area, e.g., an indoor area of a mall. In some DAS systems the distribution is done directly to the antennas and in other DAS systems it is done via remote radio units (RRUs, or simply RUs).

There is a wide range of DAS systems, but most can be characterized as either passive DAS or active DAS. FIG. 1 depicts an example of a prior art passive distributed antenna system (DAS) 100. FIG. 2 depicts an example of a prior art active distributed antenna system (DAS) 200.

In the passive DAS 100 shown in FIG. 1, the RF output/input of one or several cellular base-stations is combined and then carried by a combination of cables and splitters to the antennas. A passive DAS 100 typically uses passive RF components such as coaxial cable, splitters, taps and couplers to distribute signal inside a building. In active DAS shown in FIG. 2, the combined function is done by special unit (head-end or HE) and then distributed in digital or analog form to distributed remote radio units (RRUs), which are sometimes referred to as remote RF units or remote radioheads. Each remote unit RU is connected to one or several antennas. An active DAS, such as 200, typically converts the analog radio frequency transmissions from the signal source to a digital signal for distribution. A master unit (e.g., HE) typically performs this analog-to-digital conversion. The master unit may digitize the signal from a single carrier or multiple carriers. Once converted, the DAS typically transmits the digital signal over fiber optic or Ethernet cables to remote radio units (RRUs) that convert the signal back to an analog signal.

Both of the passive and active DAS systems, 100, 200, share the concept of separation between the parts (base-station and distribution system), by using an interface carrying the information to be transmitted by the antennas and the aggregated information that was received by the antennas. This information might be interfaced in RF (Radio frequency) or BB (baseband) signals, it might be in analog or digital protocol, and it usually passes/provides some simple signal processing and/or conditioning (amplifying/attenuating, frequency shift, filtering, on/off, etc.). This information may be referred to as "BS-ANT-Information."

By using the BS-ANT-Information interface, a number of advantages may be realized: (1) practically any base-station can be integrated with any distributed system; and (2) adding BS in one part or RUs/antennas in the other part does not influence the other part(s) of the DAS system.

A significant disadvantage of using this BS-ANT-Information interface, however, is that the base station is not aware to the cellular users (user equipment like smartphone, CPE, IoT or other) which are connected to each antenna. Usually the same information is provided to and transmitted by all of the antennas, and the received signals from all of the antennas are combined without knowing which cellular users are received by which antenna.

SUMMARY

An aspect of the present disclosure presents DAS systems and methods that are aware of cellular user/antenna relationships. The DAS systems and/or methods include or use one or more User Aware Units that provide the functionality of knowing (or, knowledge of) which cellular user(s) each antenna can communicate with (and vice versa). The UA Unit functions to gather information about the reception in each antenna in order to identify the cellular users that the respective antenna can communicate with or best communicate with compared to other cellular users.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Embodiments of the present disclosure include DAS systems and/or methods that are aware of cellular-user/antenna relationships. The DAS systems and/or methods include or use one or more User Aware (UA) Units that provide the functionality of knowing (or, knowledge of)

which cellular user(s) each antenna can communicate with (and vice versa). The UA Units function to gather information about the reception in each antenna in order to identify the cellular users that the respective antenna can communicate with or best communicate with compared to other cellular users.

Figure 1:
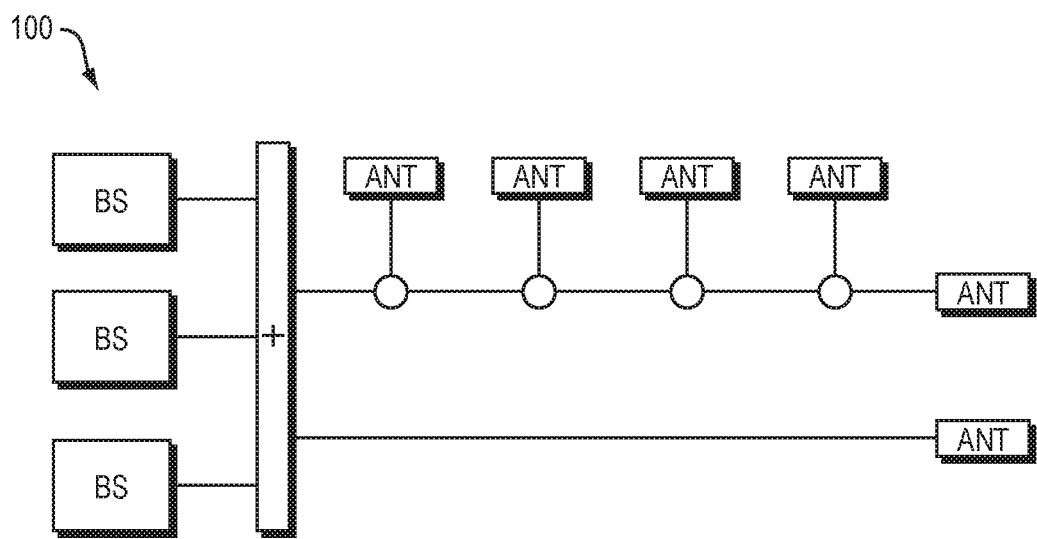
FIG. 1 depicts an example of a prior art passive distributed antenna system (DAS).
Figure 2:
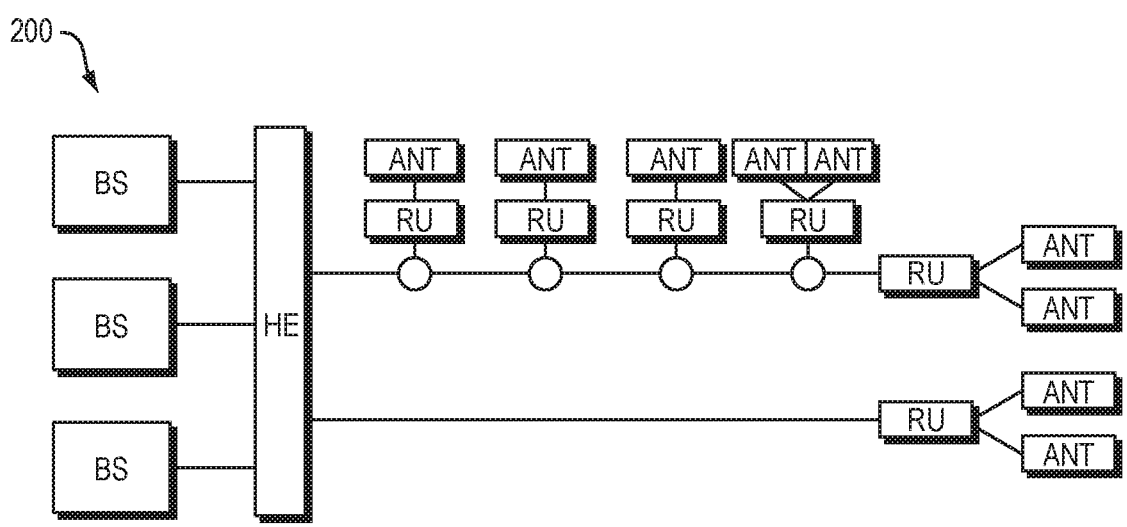
FIG. 2 depicts an example of a prior art active distributed antenna system (DAS).
Figure 3:
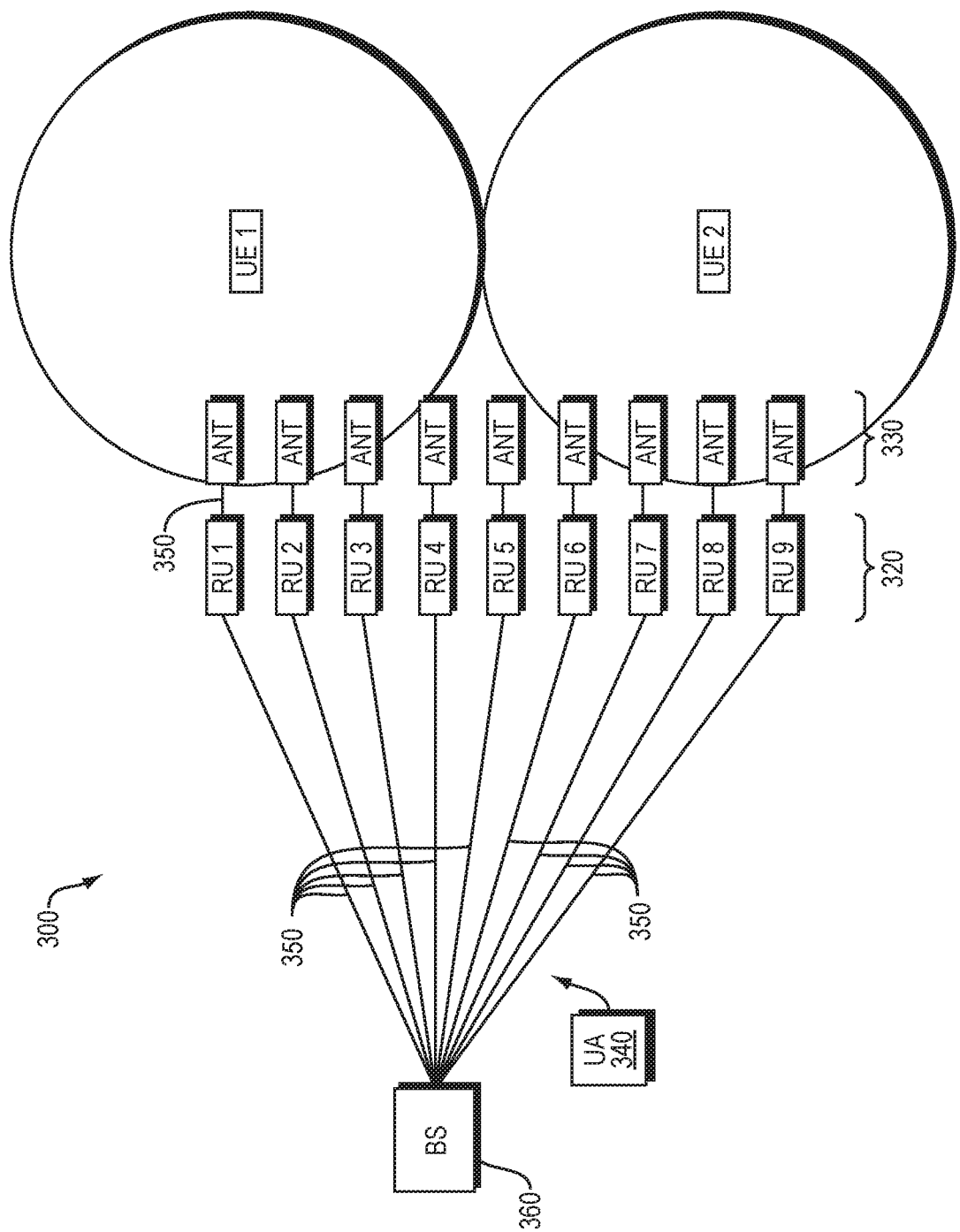
FIG. 3 depicts an exemplary embodiment of a User Aware (UA) distributed antenna system (DAS), in accordance with the present disclosure.

FIG. 3 depicts an exemplary embodiment of a User Aware (UA) distributed antenna system (DAS) 300, in accordance with the present disclosure. US DAS 300 includes a base station 310, a number of remote radio units 320 (RU-1 to RU-9), which are shown connected, respectively, to a number of antennas 330 (ANT-1 to ANT-9). Two instances of representative user equipment (UE 1 and UE 2) are shown. A User Aware (UA) Unit 340 is included in the DAS system 300, and enables the DAS system 300 to be aware of which cellular user or users (UE) is/are communicating with each antenna (or RU). A distribution network 350 is shown connecting the base station 310, the radio units 320, and the antennas 330.

As illustrated in FIG. 3, in operation, the User Aware DAS system 300 determines or has knowledge—by way of the User Aware Unit 340—that certain user equipment is in closer or closest proximity to certain antennas. For the example situation shown in FIG. 3, UE-1 is very close to ANT-1 and ANT-2 and UE-2 is close to ANT-7, ANT-8 and ANT-9. Of course, the positional relationships shown are merely for example and others may of course be realized within the scope of the present disclosure.

Figure 4:
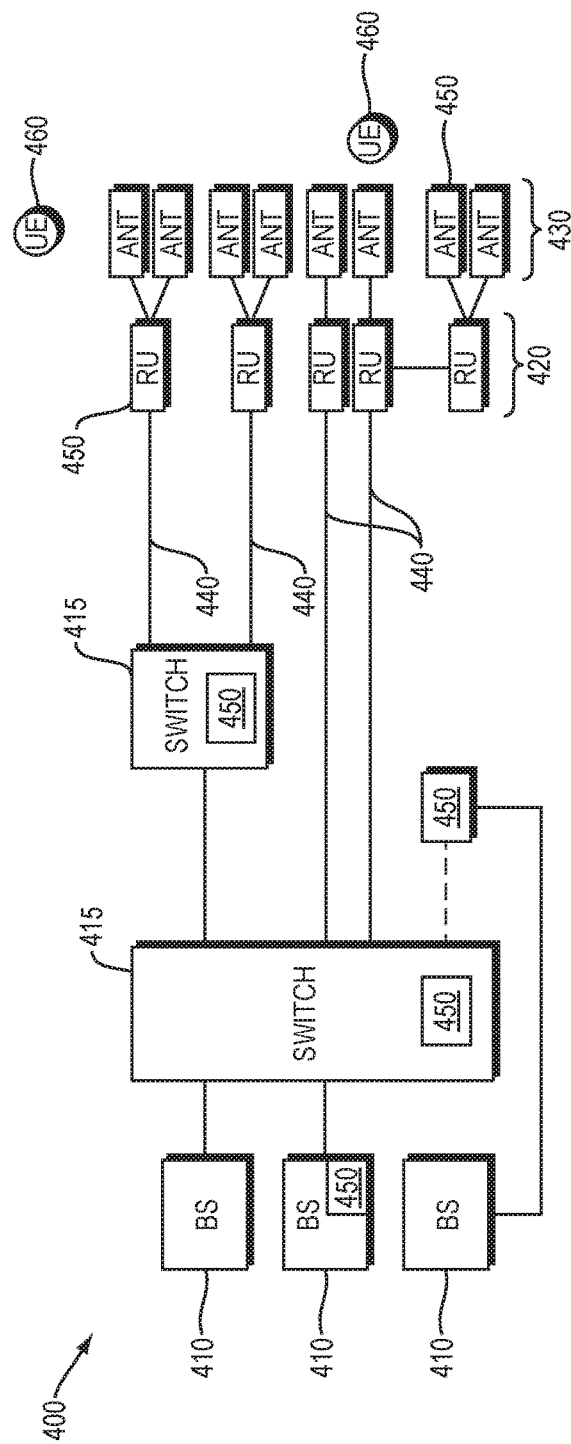
FIG. 4 depicts a general UA DAS system, illustrating how User Aware Unit can flexibly be implemented in or for a DAS system in many different and ways.

FIG. 4 depicts a general UA DAS system 400, illustrating how User Aware Unit 450 can flexibly be implemented in or for a DAS system in many different and ways. UA DAS 400 includes multiple base-stations 410m switches 415, multiple RUs 420, and multiple antennas 430 connected by a distribution network 440. UEs 460 are also shown. For non-limiting examples, the User Aware Unit 450 can be centralized and located close to the base-station, it can be part of the base-station, part of the RU, part of equipment in the distribution system (e.g., switch), or combination of the above by splitting the functionality between few elements. Moreover, the term User Aware Unit can refer to a discrete hardware component or a system (e.g., a base station controller), software, logic or programming-code in any language and at any level, e.g., a high-level language, assembly language, or machine language; and/or combinations of such hardware and software (logic or programming), including firmware.

As noted previously, the User Aware Unit can be implemented in numerous different ways within the scope of the present disclosure; two simplified embodiments (which may be referred to as methods, systems, or architectures) are described below as examples with reference to FIG. 4:

Example Implementation 1: In this implementation (embodiment) the transmission from each antenna will be slightly different. Each antenna will transmit the original signal (which is preferably the same for all antennas) plus a signal with synchronization information of a dummy BS in reduced power mode which is managed by the User Aware Unit. Each antenna has its own dummy BS. In this case when a UE send measurements reports listing the BS it is discovering, the User Aware Unit can analyze those reports in order to define each cellular user (UE, or user device, e.g., smart phone or mobile station) that is communicating with each antenna.

Example Implementation 2: In this implementation (embodiment) the distribution is preferably done by a digital interface (e.g., eCPRI, IEEE1914, or O-RAN Alliance, or the like) that distributes the uplink in the frequency domain.

In this implementation, the power at each RB (resource block) at each antenna output (actually RU output) is measured before aggregating the signal from different antennas. The User Aware Unit makes measurements and compares the results from each antenna with the allocation of RBs per cellular-user that was defined by a scheduler in the BS. The comparison can indicate each cellular user associated with (producing) signals received from each antenna. The measurements can be done, e.g., in the RU, in the BS, or in an element of the distribution network.

Knowledge of the antenna/UE relationships can be used advantageously in various ways:

Reduction of throughput requirement of the distribution system by sending/getting to/from each antenna only the information of the relevant users.

Reduction of interference in the network by managing the transmission and reception signals in each antenna.

Using the antenna/UE relationships with the antenna location information in order to identity position of UE.

Exemplary Implementation: Fully-Centralized User Aware Unit

In the following example, given with reference to FIG. 4, a specific implementation is described, based on Implementation 2 for implementation of User Aware Unit. The example assumes usage of ORAN Fronthaul, where the term "fronthaul" is used to describe the connection between the cell tower radio itself (Radio Head or RH) and the mobile network control backbone (the Baseband Unit or BBU). (The contrasting term "backhaul" typically refers to the linkage between a base-station and the core wired network, and is often fiber or coax, and in some cases broadband, proprietary wireless links.) The ORAN fronthaul is described in further detail below. The User Aware Unit in this example is fully centralized and it is preferably located in the BS (base-station).

In this type of implementation, the switches shown in FIG. 4 has no role in the User Aware capability, their purpose is to enable signals flow between the BS and the Radio Units. The BS receives all uplink signals from the RUs. The User Aware Unit at the base station analyzes all those uplink signals and provides to the system the knowledge of the position of each user. The analyzing process—or algorithm—is usually separated into two main parts or steps: detection and tracking. In the detection part the User Aware Unit detects users, e.g., a new user, as described in further detail below and in reference to FIG. 5.

Figure 5:
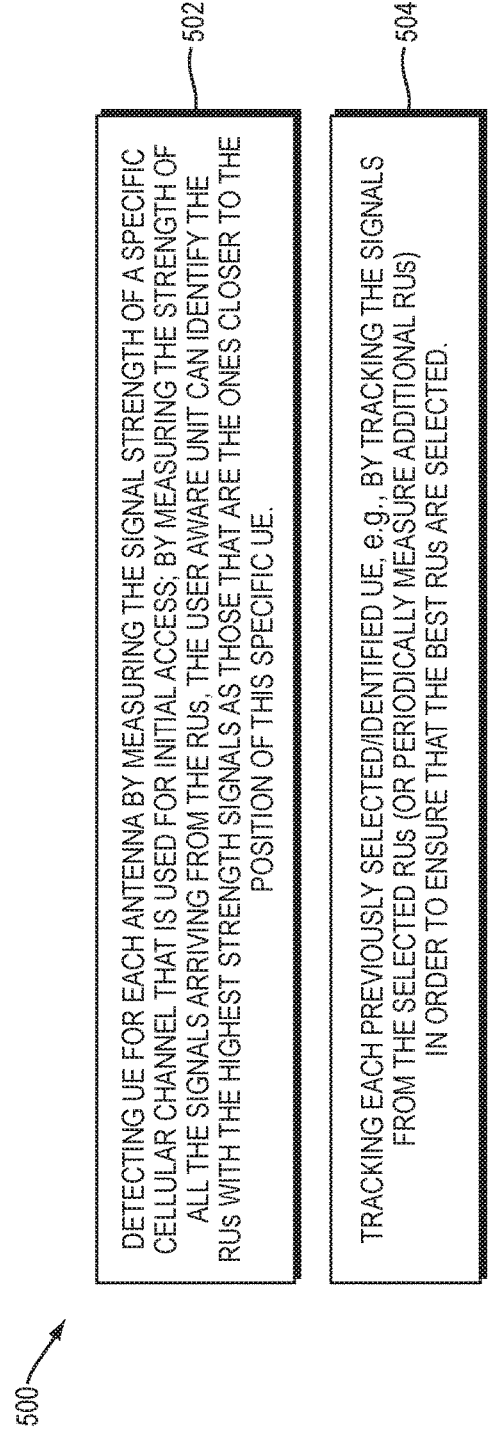
FIG. 5 depicts an embodiment of a method of operation of or algorithm for a User Aware (UA) distributed antenna system (DAS), in accordance with the present disclosure.

FIG. 5 depicts an embodiment of a method of operation of or algorithm 500 for a User Aware (UA) distributed antenna system (DAS), in accordance with the present disclosure.

As shown in FIG. 5, method or algorithm 500 includes a detection step 502. The detection can be implemented by measuring the signal strength of a specific cellular channel that is used for initial access. e.g., a physical random access channel (PRACH) in LTE. By measuring the strength of all the signals arriving form the RUs, the User Aware Unit can identify the RUs with the highest strength signals as those that are the ones closer to the position of this specific UE. If for example the system contains sixty-four (64) RUs, the User Aware Unit will select the, for example, four (4) RUs with the maximal signal strength and communicate with the user by those four RUs only. Of course while certain numbers of RUs are provided here for example, others may be used and realized within the scope of the present disclosure.

Method or algorithm 500 also includes a tracking step 504. The cellular user might move and change its location, in this case the four RUs that were selected in the detection part (step 502) might be not be the best four after the user is moving. The main purpose of this part is to track the signals from the selected four RUs (or periodically measure additional RUs) in order ensure that the best four RUs are selected. In this case the User Aware Unit is measuring the uplink data signals of the specific user. Any suitable tracking techniques can be used for step 504. Examples include but are not limited to direction of arrival techniques, signal-strength measurement techniques. Of course while certain numbers of RUs are provided here for example, others may be used and realized within the scope of the present disclosure.

Of course the two parts or steps of the method/algorithm 500 described above, i.e., detection and tracking, should be performed for each user (UE) in the coverage area in the system. A typical number of users can vary from few users up to more than 1,000 users.

As noted above, certain exemplary embodiments of the present disclosure can utilize or make use of the ORAN Fronthaul. One of the main characteristics of the Fronthaul protocol defined by the ORAN Alliance is the usage of "frequency domain split"—meaning that the physical layer processing functions are split between the BS and the RU in a way that the signals between them is represent in the frequency domain (unlike the time domain as used for the previous CPRI protocol). The usage of a protocol that uses a "frequency domain split" is not a must for implementations of the User Aware Unit but in a lot of cases it makes it easier and enables throughput reduction between the BS and the RUs.

Unless otherwise indicated, the User Aware Units that have been discussed herein are preferably implemented with a specially-configured or specially-programmed processing system or processor(s) specifically configured to perform the functions that have been described herein for the component. Each processing system may include or be used with one or more processors, tangible memories (e.g., random access memories (RAMs), read-only memories (ROMs), and/or programmable read only memories (PROMS)), tangible storage devices (e.g., hard disk drives, CD/DVD drives, and/or flash memories, and the like), system buses, video processing components, network communication components, input/output ports, and/or user interface devices (e.g., keyboards, pointing devices, displays, microphones, sound reproduction systems, and/or touch screens) and buses.

In some embodiments, each processing system for the User Aware Unit and/or user awareness functionality may be included in or as part of a desktop computer or a portable computer, such as a laptop computer, a notebook computer, a tablet computer, a PDA, a smartphone, or part of a larger system, such as a vehicle, appliance, and/or telephone system. A single processing system may be shared, e.g., by a base station, base station controller, headend, RU, smart antenna, and/or switch.

Each processor (or processing) system for the User Aware Unit and/or user awareness functionality may include or be included within one or more computers or processing systems at the same or different locations. When at different locations, the computers or processing systems may be configured to communicate with one another through one or more wired and/or wireless network communication systems.

Each processing system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A user aware distributed antenna system comprising:
a base station configured to communicate with remote radio units over a spectrum in a frequency domain;
a plurality of remote radio units connected to the base station, wherein each remote radio unit is configured to communicate with the base station over a respective dedicated part of the spectrum;
a plurality of antennas connected to the plurality of remote radio units, each configured to transmit and receive radio frequency (RF) signals from one or more user devices;
a user aware (UA) Unit operative to gather information about the reception in each antenna in order to identify the one or more user devices that the respective antenna is configured to communicate with; and
an Open Radio Access Network (ORAN) fronthaul connecting the base station and the plurality of remote radio units.

* * * * *